(12) United States Patent
Blangy

(10) Patent No.: US 9,735,840 B2
(45) Date of Patent: Aug. 15, 2017

(54) BEACON COMPRISING MULTIPLE COMMUNICATION INTERFACES WITH SECURE DEACTIVATION/REACTIVATION

(71) Applicant: EM Microelectronic-Marin SA, Marin (CH)

(72) Inventor: Hugues Blangy, Grandcour (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 14/976,860

(22) Filed: Dec. 21, 2015

(65) Prior Publication Data
US 2016/0182128 A1    Jun. 23, 2016

(30) Foreign Application Priority Data
Dec. 23, 2014  (EP) .................................... 14200123

(51) Int. Cl.
| | | |
|---|---|---|
| *H04B 5/00* | (2006.01) | |
| *G08B 27/00* | (2006.01) | |
| *H04L 29/06* | (2006.01) | |
| *H04W 4/00* | (2009.01) | |
| *H04W 12/08* | (2009.01) | |
| *H04W 88/06* | (2009.01) | |

(52) U.S. Cl.
CPC ............ *H04B 5/0056* (2013.01); *G08B 27/00* (2013.01); *H04L 63/18* (2013.01); *H04W 4/008* (2013.01); *H04W 12/08* (2013.01); *H04W 88/06* (2013.01)

(58) Field of Classification Search
CPC ........ H04B 5/0056; H04L 63/18; H04W 4/008; H04W 12/08; H04W 88/06
See application file for complete search history.

(56) References Cited

U.S. PATENT DOCUMENTS

| | | | | |
|---|---|---|---|---|
| 7,193,965 B1 * | 3/2007 | Nevo | ................. | H04W 16/14 370/230 |
| 2006/0270424 A1 | 11/2006 | Benco et al. | | |
| 2009/0098825 A1 | 4/2009 | Huomo et al. | | |
| 2010/0271177 A1 | 10/2010 | Pang et al. | | |

FOREIGN PATENT DOCUMENTS

| | | |
|---|---|---|
| JP | 2008-203790 | 9/2008 |
| WO | WO 2006/095212 A1 | 9/2006 |

OTHER PUBLICATIONS

European Search Report issued Jun. 23, 2015 in European Application 14200123, filed on Dec. 23, 2014 ( with English Translation).
Whitson Gordon "How to Automate Your Phone for Every Room in the House with NFC Tags", Lifehacker, Apr. 16, 2013, 5 pages.

* cited by examiner

*Primary Examiner* — Leon Flores
(74) *Attorney, Agent, or Firm* — Oblon, McClelland, Maier & Neustadt, L.L.P.

(57) ABSTRACT

A communication beacon including a calculation unit associated with a memory module for data storage and with a communication circuit, the beacon being powered by a power unit, the communication circuit including a first interface unit using a first protocol, a second interface unit using a second protocol, the memory unit including a first memory unit and a second memory unit each memory unit being electrically connected to each interface unit.

20 Claims, 2 Drawing Sheets

BEACON COMPRISING MULTIPLE COMMUNICATION INTERFACES WITH SECURE DEACTIVATION/REACTIVATION

This application claims priority from European patent application No. 14200123.9 filed Dec. 23, 2014, the entire disclosure of which is incorporated herein by reference.

The present invention concerns a beacon comprising a control unit associated with a memory unit for data storage, with a clock circuit and a communication circuit. This communication circuit includes one or two antenna(s), a first interface using a first protocol and a second interface using a second protocol.

PRIOR ART

There are known beacons, i.e. electronic devices self-powered by a power supply comprising a control unit associated with a memory unit for data storage, with a clock circuit and communication circuit using a communication protocol as seen in FIG. 1.

Via their communication circuit, these beacons can diffuse message to mobile terminals such as mobile telephones, tablets or computers. These mobile terminals are thus compatible with the communication protocol of the beacon.

Sent messages can take the form of advertisements or points of interest. For example, a beacon located in a department store will send messages to mobile terminals having an application dedicated to said department store informing consumers of the latest offers available in the department store. In another example, a beacon located in an airport zone could provide consumers with information about delays affecting specific flights, or temperature and humidity information for arriving passengers.

The communication protocol generally used is the Bluetooth protocol. This Bluetooth protocol defines three categories of transmitters proposing different ranges according to their transmission power varying from 1 mW to 100 mW for a range D respectively ranging from 10 m to 100 m.

However, one drawback of this type of beacons is that they are not programmable.

In response to this problem, there is proposed a beacon fitted with two communication circuits each using a different protocol. More specifically, a long distance protocol will be used for programming and a short distance protocol for standard use.

This configuration with two communication circuits result in an increased risk of hacking and therefore a decrease in the security of the beacon.

Further, it is then necessary to deactivate the communication circuit using a long distance protocol in order to prevent hacking.

SUMMARY OF THE INVENTION

It is an object of the invention to provide a communication beacon that can be deactivated and reactivated in a secure manner.

To this end, the invention concerns a communication beacon comprising a calculation unit associated with a memory module for data storage and with a communication circuit, said beacon being powered by a power unit, said communication circuit comprising a first interface unit using a first protocol, a second interface unit using a second protocol, said memory unit comprising a first memory unit and a second memory unit each memory unit being electrically connected to each interface unit, characterized in that the memory unit comprises a first memory location and a second memory location for the storage, respectively of a first message and of a second message, these first and second messages making it possible to deactivate/reactivate at least said first interface.

In a first advantageous embodiment, the first interface unit has only write access to the first location, whereas the second interface unit has only write access to the second location.

In a second advantageous embodiment, the first and second messages include a bit series comprising at least one specific bit used by an AND logic gate and the calculation unit to compare the specific bit of the first message to the specific bit of the second message.

In a third advantageous embodiment, the first protocol is a long distance protocol.

In a fourth advantageous embodiment, the second protocol is a short distance protocol.

In a fifth advantageous embodiment, the first message is sent via the first interface unit and the second message is sent via the second interface unit.

The invention also concerns a method for controlling a communication beacon comprising a calculation unit associated with a memory module for data storage and with a communication circuit, said beacon being powered by a power unit, said communication circuit comprising a first interface unit using a first protocol, a second interface unit using a second protocol, said memory unit comprising a first memory unit and a second memory unit each memory unit being electrically connected to each interface unit, characterized in that the memory module comprises a first memory location and a second memory location and in that said method includes the following steps:
1) storing a first message in a first location of the memory module and a second message in a second location of the memory module;
2) selecting a specific bit of the first stored message and a specific bit of the second stored message;
3) comparing the specific bit of the first stored message and the specific bit of the second stored message via an AND logic gate and then switching to an operation mode wherein at least one or other of the first and second interface units is deactivated.

In a first advantageous embodiment, the first interface unit is deactivated.

In a second advantageous embodiment, the second interface unit is deactivated.

In a third advantageous embodiment, the method further includes a preliminary step consisting of receiving a first message via the first interface unit and a second message via the second interface unit.

In a fourth advantageous embodiment, the second message is pre-programmed in the second memory location and further includes a preliminary step 0') consisting of receiving a first message via the first interface unit.

In another advantageous embodiment, the method further includes the steps of:
4) receiving a message via the active interface unit;
5) storing the message in the location related to the active interface unit;
6) selecting a specific bit of the message in the location related to the active interface unit and the specific bit of the message in the location related to the active interface unit;
7) comparing the specific bit of the message in the location related to the active interface unit and the specific bit of the message in the location related to the inactive interface unit via an AND logic gate and then switching to an operation mode wherein the deactivated interface unit is reactivated.

In another advantageous embodiment, the method further includes a step 8) consisting of resetting the location related to the previously inactive interface unit.

In another advantageous embodiment, the method further includes a step 9) consisting of rewriting the second message pre-programmed in the second memory location. In another advantageous embodiment, the beacon is adapted to allow the specific bit of the first and second messages and the output of the AND logic gate to be read.

In another advantageous embodiment, the method further includes an initial step preceding all other steps consisting in authenticating the device sending the first message and the second message.

BRIEF DESCRIPTION OF THE DRAWINGS

The objects, advantages and features of the present invention will appear more clearly in the following detailed description of at least one embodiment of the invention, given solely by way of non-limiting example and illustrated by the annexed drawings, in which.

DETAILED DESCRIPTION

Figure 1:
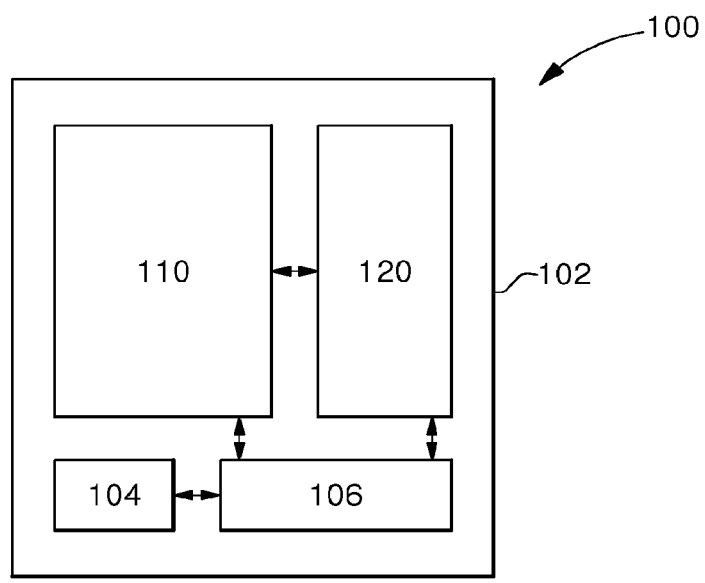
FIGS. 1 to 3 are schematic views of a beacon of the present invention.

FIG. 1 shows a beacon 100 according to the present invention.

This beacon 100 takes the form of a case 102 in which an electronic device is placed. This electronic device is powered by a power unit 104. This power unit 104 may be a battery or an accumulator or an autonomous unit such as an AC-DC converter or a solar cell. The advantage of such an autonomous unit is that it is energy-independent.

Electronic unit 100, seen in FIG. 1, comprises a calculation unit or microcontroller 106. This calculation unit is connected to a memory module 120. This calculation unit is also connected to a communication unit 110 and the communication unit also cooperates with the memory module.

Figure 2:
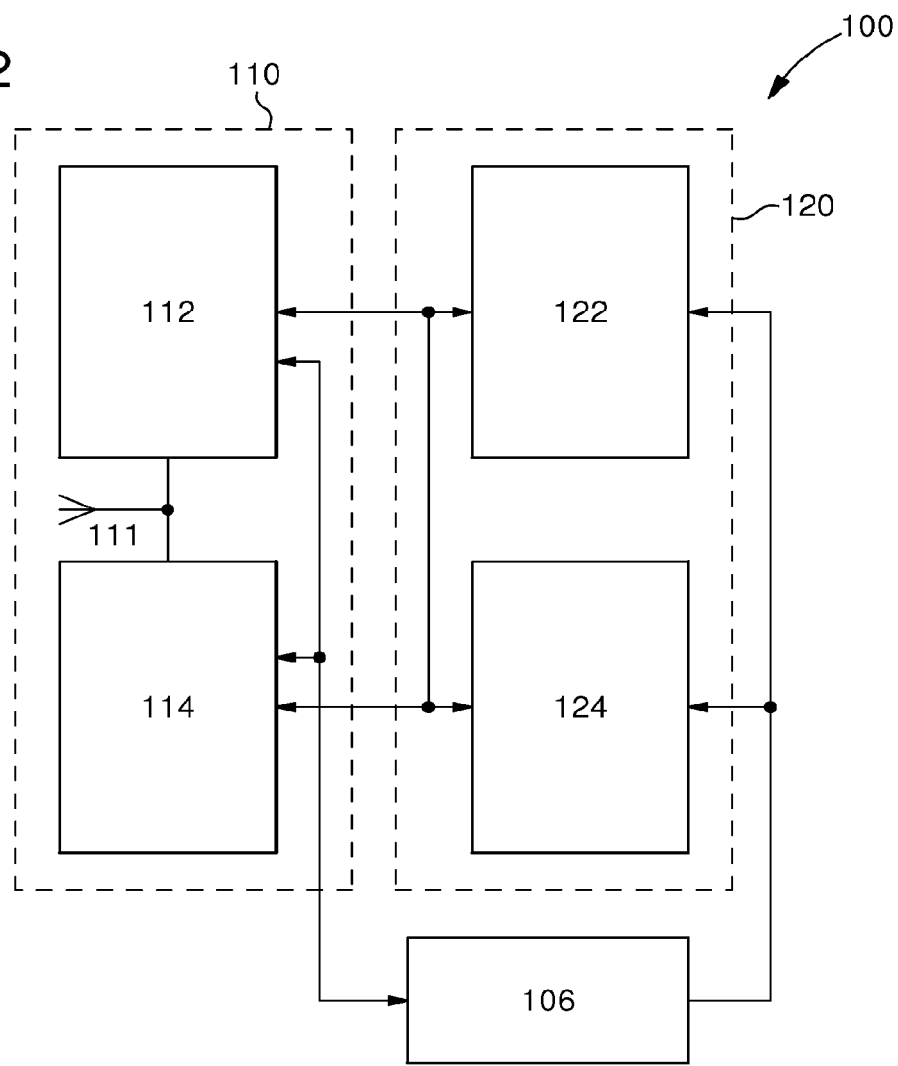

Communication unit 110, seen in FIG. 2, comprises a first interface unit 112 and a second interface unit 114. First interface unit 112 and second interface unit 114 communicate with the exterior via at least one antenna 111. First interface unit 112 is an interface unit using a first communication protocol P1, while second interface unit 114 uses a second communication protocol P2. More preferably, first interface unit 112 uses a first, long distance communication protocol, while second interface unit 114 uses a second, short distance communication protocol. The long distance communication protocol may be of the Bluetooth or EPC type (with a frequency range from 860 MHz to 960 MHz) and the second, short distance communication protocol may be of the NFC type.

Further, memory module 120 also includes a first memory unit 122 connected to first interface unit 112 and a second memory unit 124 connected to second interface unit 114. Having two distinct memory units each connected to an interface unit allows for greater information processing efficiency.

Indeed, having a single memory requires the entire memory to be scanned to find one piece of information amongst all the information comprising information about the first protocol and about the second protocol. However, with two distinct memory units, the area to be scanned is smaller and efficiency is therefore increased.

Advantageously according to the invention, beacon 100 is configured such that the deactivation or reactivation of the first interface unit uses a first long distance communication protocol which is more secure.

To achieve this, first interface 112 is also connected to second memory unit 124 and second interface 114 is also connected to first memory unit 124. Consequently, each interface is connected to both memory units.

In order to deactivate the first interface, there is a procedure which provides for the sending of a first deactivation message M1. One such first message M1 consists of a series of bits sent to a specific memory location. In the case of deactivation of first interface 112 using a long distance protocol P1, the first message M1 is sent to a first location of first memory unit 122 associated with said first interface 112. First message M1 is then sent via long distance protocol P1 and received by first interface 112.

Advantageously, the invention increases the security of deactivation of first interface 112 of communication unit 110 by providing for the sending of a second message M2. This second message M2 is transmitted to beacon 100 of the invention by using second interface 114, i.e. here the interface using short distance protocol P2. Second message M2, transmitted by this short distance protocol P2 and received by second interface 114, is placed in the memory in a second specific memory location 124.

Figure 3:
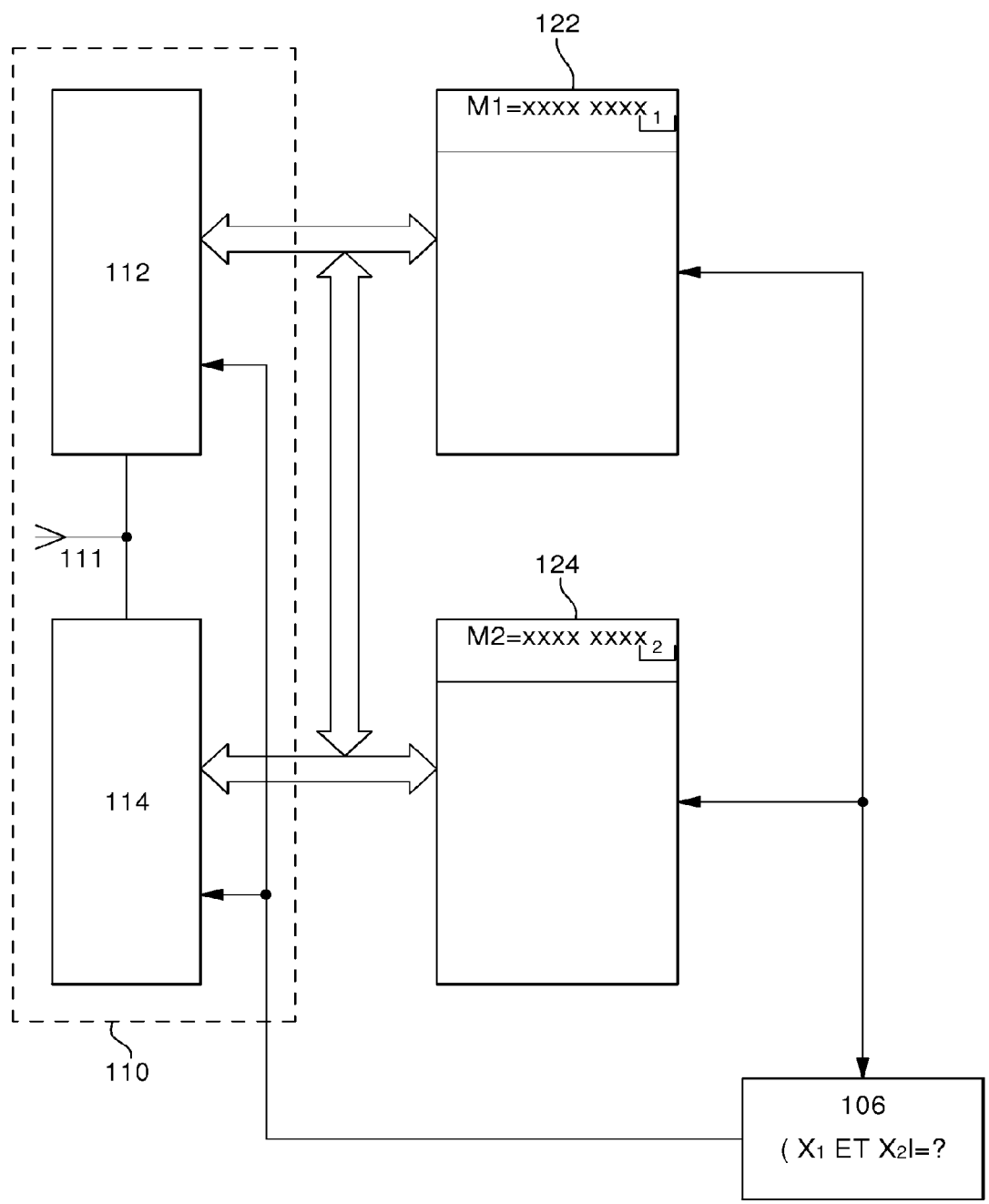

This feature makes it possible to have two messages which are compared, so that the calculation unit is sure of the instruction received. Indeed, each of its messages includes a series of bits X and one deactivation bit Xi, deactivation bit $X_1$ for first message M1 and deactivation bit $X_2$ for second message M2, so that calculation unit 106 takes these deactivation bits to perform a comparison step, as seen in FIG. 3.

This comparison step consists in causing the two deactivation bits $X_1$, $X_2$ to enter a logic gate, here an AND gate, and then considering the output obtained. If the two deactivation bits $X_1$, $X_2$ are at logic level "1", the output will be at logic level "1" meaning that the first interface 112 must be deactivated. If the logic gate output is at logic level "0", this means that at least one of the two deactivation bits X1, $X_2$ is at logic level "0". If at least one of the two deactivation bits X1, $X_2$ is at logic level "0", this means that one of the two messages M1, M2 is corrupted or that there has been an attempt to hack the beacon.

It is thus clear that having two distinct messages for the deactivation of one of the interface units provides optimised security.

The invention cleverly provides for the partitioning of the memory accesses to further optimise security. More specifically, calculation unit 106 is arranged to configure the first interface unit 112 so that the latter can only have write access, when first message M1 is sent, to the location intended to store said first message. Calculation unit 106 configures the second interface unit 114 so that the latter can only have write access, when second message M2 is sent, to the location intended to store said second message. This location intended to store said second message may be in first memory unit 122 or in second memory unit 124.

To reactivate the first interface unit, the beacon of the invention provides for the sending of at least one reactivation message. This message is sent via the interface unit that is still active, i.e. second interface unit 114 using the second, short distance protocol P2. This second interface unit 114 using the second, short distance protocol P2 thus provides a certain level of security, given that this requires proximity between the device sending the reactivation message and beacon 100.

This reactivation message is similar to the deactivation message. The reactivation message is stored, by said beacon, in the specific memory location intended to store said second message, this specific location being in first memory unit 122 or in second memory unit 124. The reactivation message includes a reactivation bit, similar to the deactivation bit of the first and second deactivation messages, so that calculation unit 106 takes the reactivation bit and the deactivation bit of the first message to perform a comparison step.

This comparison step consists in causing the two bits to enter a logic gate, here an AND logic gate, and then considering the output obtained. In theory, the specific reactivation message bit is at logic level "0", whereas the specific bit $X_1$ of the first message sent during deactivation is at logic level "1". The output will thus be at logic level "1", meaning that first interface 112 must be reactivated.

Once first interface unit 112 is reactivated, a step performed immediately after reactivation of first interface unit 112 consist in performing a reset operation so that the first specific location is set to zero.

The first interface can then be deactivated again by sending two messages, in order to obtain logic level "1" at the output of the AND gate.

In a first variant, the beacon could be arranged to be pre-programmed, so that one of the two specific deactivation storage locations is set at "1". Preferably, the pre-programmed location will be the location dedicated to second message M2 sent via second interface unit 114 using second protocol P2. This location will be programmed with a series of bits so that the specific bit used for comparison in the AND logic gate will be at logic level "1" again.

In a second variant, it is possible to envisage reading stored data. To achieve this, it is possible to use second interface unit 114 using short distance protocol P2 to read the memory locations. Indeed, if the memory accesses are restricted in writing, they are not restricted in reading, so that second interface unit 114 can only write in the second memory location but it can read the first memory location and the second memory location. This makes it possible to know the status of first interface unit 112 and ensure that it is deactivated. Thus, it is possible to read, via a device such as a mobile telephone or a tablet, the specific bits of the two memory locations and to create an AND logic gate to deduce the status of first interface unit 112. Alternatively, the result of the AND logic gate can be directly read by the device. In this manner, the user can be reassured that the long distance protocol is deactivated, and therefore that no-one can access the data contained in the memory unit without his knowledge.

Nonetheless, it is possible, when a memory location is already programmed, to simply read the non-programmed memory location. Thus, in the case of the first variant wherein the second message stored in the second memory location is pre-programmed, it is sufficient simply to read the first message M1 stored in the first memory location to know the status of the beacon.

System security can be increased by adding a preliminary step in which the beacon authenticates the reader. Indeed, it may be useful to have this preliminary identification step in which an identification code is transmitted and analysed in order to determine whether the device attempting to communicate with the beacon is authorised to do so.

It will be clear that various alterations and/or improvements and/or combinations evident to those skilled in the art may be made to the various embodiments of the invention set out above without departing from the scope of the invention defined by the annexed claims.

Of course, it is possible to envisage that the first and second sent messages M1, M2 deactivate the first interface unit and the second interface unit.

Likewise, it will be understood that protocols P1 and P2 are not be limited to the protocols mentioned.

What is claimed is:

1. A communication beacon comprising:
a memory storing data;
processing circuitry associated with the memory;
a first interface using a first protocol; and
a second interface using a second protocol,
wherein said memory includes a first memory and a second memory each of the first and second memories being respectively electrically connected to each of the first and second interfaces, and
wherein the memory includes a first memory location and a second memory location, respectively storing, a first message received via the first interface using the first protocol and a second message received via the second interface using the second protocol, said first and second messages being compared against each other by said processing circuitry to determine whether to allow deactivation/reactivation of at least said first interface.

2. The communication beacon according to claim 1, wherein the first interface has only write access to the first location whereas the second interface has only write access to the second location.

3. The communication beacon according to claim 1, wherein the first and second messages comprise a series of bits including at least one specific bit used by an AND logic gate of the processing circuitry in order to compare the specific bit of the first message to the specific bit of the second message.

4. The communication beacon according to claim 1, wherein the first protocol is a long distance protocol.

5. The communication beacon according to claim 1, wherein the second protocol is a short distance protocol.

6. The communication beacon according to claim 1, wherein the first message is sent via the first interface and in that the second message is sent via the second interface.

7. A method for controlling a communication beacon comprising a memory storing data, processing circuitry associated with the memory, a first interface using a first protocol, a second interface using a second protocol, said memory including a first memory and a second memory each of the first and second memories being respectively electrically connected to each of the first and second interfaces, the memory including a first memory location and a second memory location, the method comprising:
storing a first message in a first location of the memory and a second message in a second location of the memory;
selecting a specific bit of the first stored message and a specific bit of the second stored message; and
comparing the specific bit of the first stored message to the specific bit of the second stored message via an AND logic gate, if the output is at logic level "1" switching to an operation mode wherein at least one or other of the first and second interface is deactivated, otherwise remaining in the current operating mode.

8. The control method for the communication beacon according to claim 7, wherein the first interface is deactivated.

9. The control method for the communication beacon according to claim 8, wherein the method further includes a preliminary step consisting of receiving a first message via the first interface and a second message via the second interface.

10. The control method for the communication beacon according to claim 8, wherein the second message is pre-programmed in the second memory location and further includes a preliminary step consisting of receiving a first message via the first interface.

11. The control method for the communication beacon according to claim 10, wherein the method further comprising an initial step preceding all other steps consisting of authenticating a device sending the first message and the second message.

12. The control method for the communication beacon according to claim 7, wherein the second interface is deactivated.

13. The control method for the communication beacon according to claim 12, wherein the method further includes a preliminary step consisting of receiving a first message via the first interface and a second message via the second interface.

14. The control method for the communication beacon according to claim 12, wherein the second message is pre-programmed in the second memory location and further includes a preliminary step consisting of receiving a first message via the first interface.

15. The control method for communication beacon according to claim 14, wherein the method further comprises an initial step preceding all other steps consisting of authenticating a device sending the first message and the second message.

16. The control method for the communication beacon according to claim 7, wherein the method further comprises:
   receiving a message via an active interface;
   storing the message in a location related to the active interface;
   selecting a specific bit of the message in the location related to the active interface and a specific bit of a message in a location related to a deactivated interface;
   comparing the specific bit of the message in the location related to the active interface and the specific bit of the message in the location related to the deactivated interface via an AND logic gate and then switching to an operation mode wherein the deactivated interface is reactivated.

17. The control method for the communication beacon according to claim 16, wherein the method further comprising a step consisting of resetting the location related to the deactivated interface.

18. The control method for the communication beacon according to claim 16, wherein the method further comprising a step consisting of rewriting the second pre-programmed message in the second memory location.

19. The control method for the communication beacon according to claim 16, wherein the method further comprising a step consisting of rewriting the second pre-programmed message in the second memory location.

20. The control method for the communication beacon according to claim 7, wherein the communication beacon is configured to allow the specific bit of the first and second messages and the output of the AND logic gate to be read.

* * * * *